United States Patent [19]

McCloskey

[11] 3,989,322

[45] Nov. 2, 1976

[54] SPHERICAL BEARING ASSEMBLY

[75] Inventor: Albert R. McCloskey, Fairfield, Conn.

[73] Assignee: The Heim Universal Company, Fairfield, Conn.

[22] Filed: Aug. 20, 1975

[21] Appl. No.: 606,263

Related U.S. Application Data

[63] Continuation of Ser. No. 464,578, April 26, 1974, abandoned.

[52] U.S. Cl. .................................. 308/72; 308/70; 308/197
[51] Int. Cl.² ......................................... F16C 23/02
[58] Field of Search ................... 308/72, 58, 62, 65, 308/66, 69, 70, 195, 196, 197; 29/148.4 R, 148.4 A, 148.4 B, 149.5 R, 149.5 B

[56] References Cited
UNITED STATES PATENTS 2,478,056   8/1949   Reeg ..................................... 308/72

FOREIGN PATENTS OR APPLICATIONS 79,623   10/1931   Sweden ................................ 308/70

Primary Examiner—L. J. Paperner
Assistant Examiner—Randolph A. Reese
Attorney, Agent, or Firm—James C. Wray

[57] ABSTRACT

A spherical bearing assembly having an inner race member and an outer race member, the inner surface of the outer race member being a concave spherical surface, the outer surface of the inner member being a complementary convex spherical surface, the inner member including a spool member having first and second threaded portions disposed on its outer surface at each end thereof and a smooth truncated conical section interposed therebetween, at least three spherical segments, each segment having a conical portion on its inner surface complementary to the truncated conical section on the outer surface of the spool member, first and second internally threaded annular rings adapted to be threaded on each end of the spool member in meshing relationship with the first and second threaded portions on each end of the spool member respectively, the segments disposed on and interlocked with the spool member by the annular rings.

3 Claims, 8 Drawing Figures

SPHERICAL BEARING ASSEMBLY

This is a continuation of application Ser. No. 464,578, filed Apr. 26, 1974, now abandoned.

BACKGROUND OF THE INVENTION

The present invention relates generally to self-aligning bearings having a ball-like inner member with a convex outer surface and an outer member having an inner surface with a complementary concave spherical inner face. These types of bearings, which are commonly called "spherical bearings," have been utilized in industry for a substantial period of time. The technological evolution of these type bearings has been directed more in the terms of material composition of its various component parts rather than toward basic changes in design concepts. Accordingly, the design advances in spherical bearings have not been substantial in nature and thereby presently limiting their applications.

One area in which the spherical bearings have been extensively applied is the aircraft industry. This is due to the spherical bearing self-aligning characteristic. A typical such application is marrying of a spherical bearing to machine tool or to a landing gear strut or member of an airplane. In these types of applications the outer race is commonly press-fitted and/or staked into a housing or the like, rendering it difficult to remove and/or maintain. When any such maintenance is required, such as replacing of the ball, the entire bearing assembly including the inner and outer race member would have to be removed and replaced by an entirely new bearing assembly. Such an operation could entail substantial expense and down time of the entire machine tool or aircraft.

There are a number of prior art type spherical bearings which have been addressed to this kind of problem. One such type prior art bearing is the "Messerschmidt" bearing. A concept of this bearing is that the ball can be removed in the field without disassembling the entire bearing, that is, removing the outer race member from its mounting. The messerschmidt type spherical bearing has proved somewhat unsatisfactory in that its overall bearing surface is decreased by the provision of a slot. This decrease or rather limited bearing surface area has a marked negative effect on the bearing performance characteristics.

SUMMARY OF THE INVENTION

It is therefore, a primary object of the present invention to provide a spherical bearing assembly having an inner race member and an outer race member, the inner surface of the outer race member being a concave spherical surface, the outer surface of the inner member being a complimentary convex spherical surface, the inner member including a spool member having first and second threaded portion disposed on its outer surface at each end thereof and a smooth truncated conical section interposed therebetween, at least three spherical segments, each segment having a conical portion on its inner surface complementary to said truncated conical section on the outer surface of said spool member, first and second internally threaded annular rings adapted to be threaded on each end of said spool member in meshing relationship with said first and second threaded portions on each end of said spool member respectively, said segments disposed on and interlocked with said spool member by said annular rings.

It is yet another object of the present invention to provide a spherical bearing assembly in which the spherical segments may be assembled on the spool member before either annular ring is threaded upon the spool member, the first annular ring being threaded upon the spool member at the smaller diameter end, the annular ring having a lateral face which abuts the lateral face of the spherical segments to displace the spherical segments in an axial direction thereby changing the clearance between the convex outer surface of the spherical segments and the concave inner surface of the outer race member, the second annular rings being threaded upon said spool member in abutting relation to the spherical segments once the desired clearance is obtained to axially and positionally lock the spherical segments on the spool member.

It is yet another object of the present invention to provide a spherical bearing assembly which is adapted to be assembled by the method including the steps of preforming the outer race member, placing the spool member within the outer race member placing at least three spherical segments on said spool member and within said outer race member such that said spherical segments form an inner race member, threading an annular ring on one end of said spool member to axially adjust said spherical segments on said spool member, interlocking said spherical segments on said spool member by threading a second annular ring on the spool members opposite to the first annular ring and in abutting relation to a lateral face on the spherical segments.

It is still another object of the present invention to provide a spherical bearing assembly in which the convex outer surface of the spherical segments define a first bearing surface, said concave inner surface of said outer race member defining a second bearing surface.

It is yet another object of the present invention to provide a spherical bearing assembly in which the outer conical surface of said spool member defines a third bearing surface and said inner conical surfaces of said spherical segments define a fourth bearing surface.

It is still another object of the present invention to provide a spherical bearing assembly in which the first and second bearing surfaces have a primary operational bearing surface and said third and fourth bearing surfaces define a secondary redundant bearing surface capable of accommodating movement should there be "binding" between the first and second bearing surfaces.

It is still another object of the present invention to provide a spherical bearing surface in which the various bearing surfaces may be coated with a self-lubricating plastic such as "teflon," a trademark of the DuPont Corporation.

It is still another object of the present invention to provide a spherical bearing assembly in which the outer surface of the annular rings may be provided with planar surfaces or knurled surfaces adapted to be grasped by a tool such as a wrench or the like to assist in the manipulation of the annular ring upon the spool.

Embodiments of the bearing according to the concept of the present invention are shown and/or described by way of example in the accompanying drawings and following description of the invention without attempting to show or describe all of the various forms and modifications in which the invention might be embodied; the invention being measured by the appended claims and not by the details of the specification.

DESCRIPTION OF THE INVENTION

Figure 1:
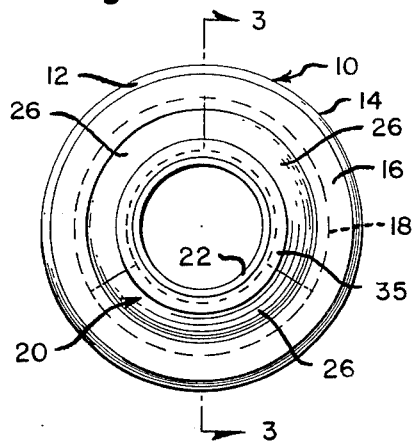
FIG. 1 is a side elevational view of the spherical bearing assembly embodying the present invention with the longitudinal axis of the outer race member and the inner race member being substantially coincident.
Figure 2:
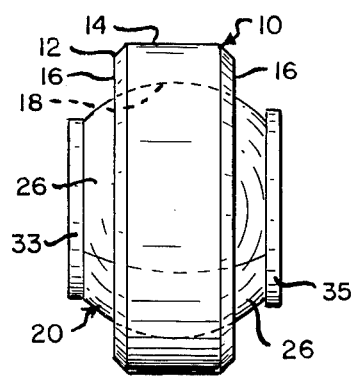
FIG. 2 is a front elevational view of the spherical bearing assembly of FIG. 1.
Figure 3:
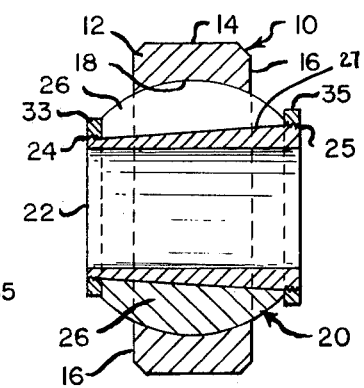
FIG. 3 is a front sectional view taken along line 3—3 of FIG. 1.
Figure 6:
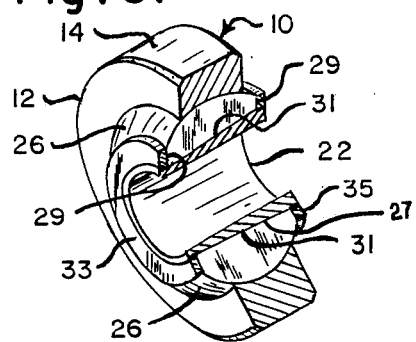
FIG. 6 is a perspective sectional view of the spherical bearing of FIG. 1.
Figure 4:
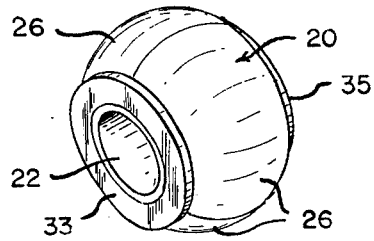
FIG. 4 is a perspective view of the inner race member alone in an assembled condition.
Figure 5A:
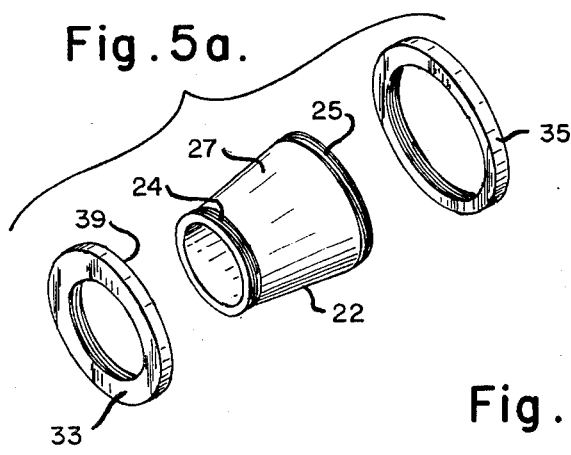
FIGS. 5a, 5b, 5c illustrate a perspective view of the component parts of the inner race member of FIG. 4.
Figure 5B:
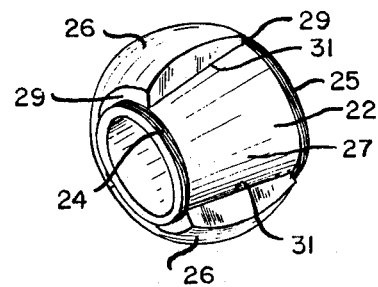
Figure 5C:
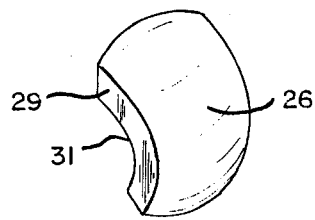

A spherical bearing embodying the concept of the present invention is generally indicated, as appropriate, by numeral 10 on the attached drawing as set forth in FIGS. 1 through 6, inclusive.

The bearing 10 has been shown as a spherical bearing, however, the present invention is also directly applicable to male or female rod end type bearings and the like.

The spherical bearing 10 comprises an outer member 12 which may be provided with an outer cylindrical surface 14. The outer member 12 may also be provided with two annular faces 16. The outer member 12 is further provided with a concave spherical inner surface 18. It may be noted at this juncture that the outer member 12 may be similar to the outer race members as found in the piror art.

The basic thrust of the present invention is to be found in the inner member which is typically formed, in the prior art, as a single solid member. The inner member 20 as distinguished from the inner members of the prior art is a composite member having several parts. The basic part or member is a spool member 22. The spool member 22 may be characterized as a spool member having a first threaded portion 24 and a second threaded portion 25 at each end thereof. The thread configuration of the first and second threaded portions 24 and 25 on the spool member 22 may be formed in helical fashion and may be selected from a number of different types of threads as found in a typical mechanical engineering handbook, as for example, MARK'S STANDARD HANDBOOK FOR MECHANICAL ENGINEERS, Seventh Edition, Section 8, MACHINE ELEMENTS.

The spool member 22 may be further provided with a truncated conical section 27 interposed between the first threaded portion 24 and the second threaded portion 25. The conical outer surface of the spool member 22 may define a smooth surface. The inner member 20 is also provided with at least three spherical segments 26. As can be seen from the various figures, the three spherical segments 26 when placed within the outer race member 12 in an abutting relationship from the bearing surface of the inner member 20. The spherical segments 26 are provided with lateral faces 29. The inner surface of the spherical segments 26 provide a surface 31 complementary to the truncated conical surface 27 of the outer surface of the spool member 22. The inner race member 20 may be further provided with a first annular ring 33 and a second annular ring 35 each internally threaded and adapted to be threaded in a meshing relationship with the threaded portion 24 and 25, respectively on the spool member 22.

The spherical bearing assembly 10 can be assembled in the following manner. The spool member 22 may be placed within the outer race member 12 in such a fashion that it fits entirely within the outer race member 12 and the longitudinal axes of the outer race member 12 and the spool member 22 being substantially perpendicular. With the spool member 22 arranged within the outer race member 12, the spherical segments can be assembled on the spool member 22 and within the outer race member 12 so as to form a continuous spherical body around the spool member 22 as shown in the various figures. There are three such spherical segments. Obviously, a greater number of spherical segments could be assembled on a spool member 22. The spherical segments 26 as before mentioned are provided with conical surfaces complementary to the truncated conical surface of the outer surface of the spool member 22. With the spherical segments 26 so assembled on the spool member 22 the first annular ring 33 may be placed in inter-meshing relationship with the first threaded portion 24 of the annular ring 33 and may be provided with a lateral face 39 which will abut the lateral face 29 of the spherical segments 26. To thread the annular ring 33 on the spool member, the spool member will have to be rotated from its assembled position as before described to a position where its longitudinal axis is substantially parallel and coincident with the longitudinal axis of the outer race member 12. By so threading the first annular ring 33 in abutting relationship to the spherical segments 26 it can be seen that the spherical segments can be moved radially with respect to the spool member 22. The conical shape or form of the spool member 22 interacts with the complementary conical portion as defined by the inner surfaces of the spherical segments 26 will tend to reduce the clearance between the concave inner surface of the outer race member 12 of the convex outer surface of the inner member 20. Accordingly, a desired fit or tolerance may be obtained by the threading of the annular ring in a clockwise, counterclockwise direction which ultimately results in the radial translation of the spherical segments with respect to the spool member. After the desired tolerance or clearance is obtained between the various parts of the spherical bearing assembly 10, the second annular ring 35 which is also internally threaded may be threaded into an abutting relationship with a lateral face 29 of the spherical segments 26 opposite to the lateral face abutted by the first annular ring 33. The abutting action of the second annular ring 35 against the lateral face of the spherical segments 26 positively locks and maintains the position of the spherical segments 26 on the spool member 22. It can be seen therefore that one is able to obtain a "micrometer" effect with the interaction of the first axial ring with respect to the spool member and the spherical segments 26. This enables one to adjust bearing tolerances in the field as well as enable one to completely replace the inner race member in the field.

The outer surface of the first annular ring 33 and the second annular ring 35 may be provided with a nut-like structure or knurled structure (neither shown) for the application of a tool such as a wrench which will assist in the threading of the various parts into their respective interlocking relationship.

As before mentioned, the disclosed bearing 10 was provided with a bearing redundancy in that the spherical segments could rotate about the spool member if binding should be experienced between the outer race member and the spherical segments. That is, if there should be interference experienced between the concave inner surface of the outer race member 12 and the convex outer surface of the inner race member 20, this would not necessarily jam or lock the entire bearing assembly for a certain degree of movement could be accommodated by the bearing surfaces defined by the outer surface of the spool member and the inner surface of the spherical segments.

The first annular ring 33 and the second annular ring 35 may be further provided with locking means (not shown) such as set screws or the like which would further positively lock the annular rings 33 and 35 in their position on the spool member 22.

The various bearing surfaces before mentioned could be suitably coated with self-lubricated plastic such as "teflon" to enhance their bearing characteristics.

As before mentioned, the present invention provides a marked improvement in the ability to service spherical bearings in the field without displacing or otherwise dislodging the outer race member. This is accomplished without any compromise in the bearing performance or characteristic such as a reduction in the overall bearing surface which is typified by the prior art bearings such as the messerschmidt type ball spherical bearing.

From the above description of the invention along with various figures as set forth in the drawings it will be readily seen and appreciated that a spherical bearing embodying the concept of the present invention will positively and effectively accomplish the objectives of the invention. The above-noted embodiment is shown by way of example without attempting to show all the various forms and modifications in which the invention might be embodied; the invention being measured by the appended claims and not the specific details of the specification.

I claim:

1. A spherical bearing assembly having an inner race member and an outer race member, the inner surface of the outer race member being a concave spherical surface, the outer surface of the inner member being a complementary convex spherical surface, the inner member including a spool member having first and second threaded portions disposed on its outer surface at each end thereof and a smooth truncated conical section interposed therebetween, at least three spherical segments, each segment having a conical portion on its inner surface complementary to the truncated conical section on the outer surface of the spool member, the conical portions of the segments directly contacting the conical outer surface of the spool member, first and second internally threaded annular rings adapted to be threaded on each end of the spool member in meshing relationship with the first and second threaded portions on each end of the spool member respectively, the segments disposed on and interlocked with the spool member by the annular rings, whereby the conical section, the conical portions, and the rings are concurrently used to adjust spaces between adjacent segments, between the inner and outer members, and between the segments and the spool.

2. A spherical bearing assembly in accordance with claim 1 further comprising an adjustable clearance between the inner race member and the outer race member at the inner surface of the outer race member and the outer surface of the inner member which adjustable clearance adjusted by the rotation of said first annular ring in clockwise or counterclockwise direction, said second annular ring maintaining the desired clearance by abutting the lateral face provided on the sides of said spherical segments thereby relatively axially sliding the spool and spherical segments and moving the spherical segments with respect to each other.

3. A spherical bearing assembly in accordance with claim 1 in which said convex outer surface of said spherical segments define a first bearing surface, said concave inner surface of said outer race member defining a second bearing surface in bearing contact with said first bearing surface, said outer conical surface of said spool member defining a third bearing surface and said inner conical surface of said spherical segments defining a fourth bearing surface in bearing contact with said third bearing surface, said first and second bearing surfaces comprising the primary operational bearing surface of said spherical bearing assembly, said third and fourth bearing surface providing a secondary bearing surface for said spherical bearing assembly.

* * * * *